UNITED STATES PATENT OFFICE.

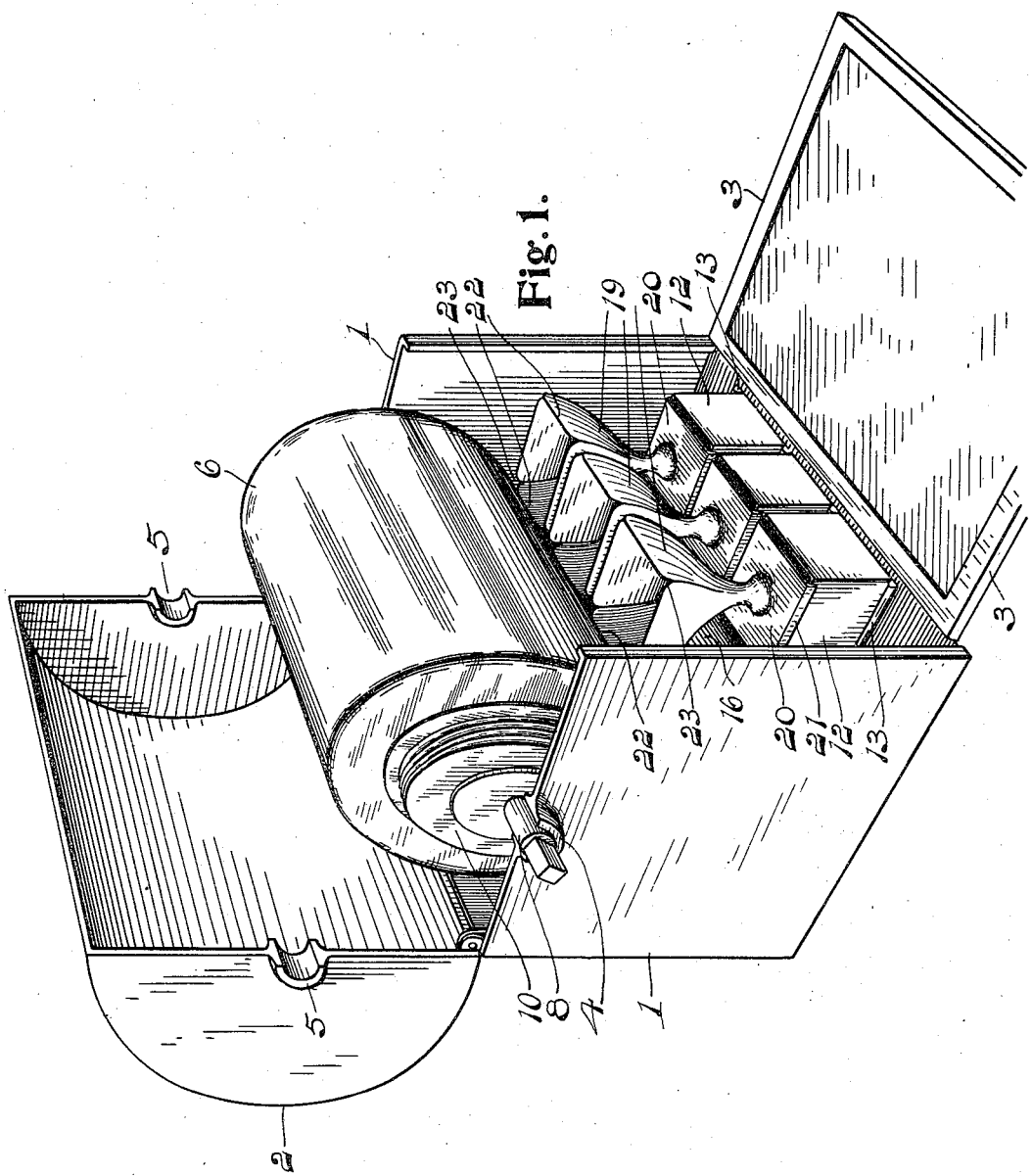

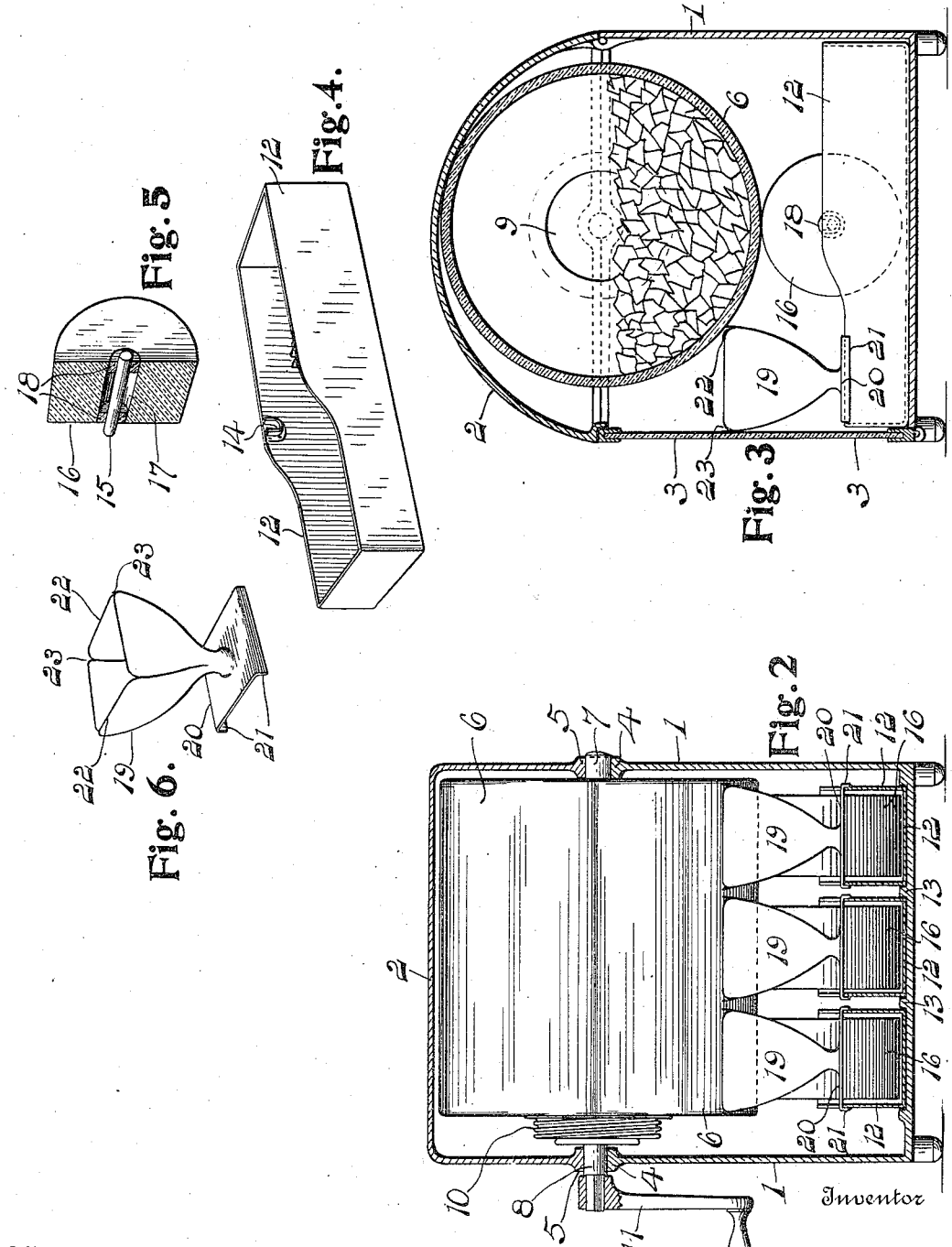

WILLIAM C. BROADWELL, OF DETROIT, MICHIGAN, ASSIGNOR TO DAVID P. WILSON, OF DETROIT, MICHIGAN.

ICE-CREAM FREEZER.

979,823.  Specification of Letters Patent.  Patented Dec. 27, 1910.

Application filed March 19, 1910. Serial No. 550,438.

*To all whom it may concern:*

Be it known that I, WILLIAM C. BROADWELL, a citizen of the United States of America, residing at Detroit, in the county of Wayne and State of Michigan, have invented certain new and useful Improvements in Ice-Cream Freezers, of which the following is a specification, reference being had therein to the accompanying drawings.

This invention relates to a freezer for ice-cream and similar materials and more particularly to that class of such devices in which a cylinder for containing the freezing medium is employed and the material to be frozen is applied to the exterior of the cylinder and after freezing is scraped therefrom as the cylinder is turned.

The object of this invention is to provide a very simple, cheap and compact device for the purpose, providing a convenient and sanitary arrangement and embodying certain new and useful features as hereinafter more fully described reference being had to the accompanying drawings in which, Figure 1 is a perspective view of a device embodying the invention showing the casing open; Fig. 2 is a longitudinal vertical section through the casing; Fig. 3 a transverse vertical section of the same; Fig. 4 a perspective view of one of the pans detached; Fig. 5 a sectional perspective view of one of the pan rolls; and Fig. 6 a perspective view of one of the cups detached.

As shown in the drawings 1 represents a suitable casing having a semi-circular hinge top 2 and a glass door 3 forming the front of the casing, which door is hinged at its lower edge to the bottom of the casing. Suitable bearings are provided in the ends of the casing one half 4 of each bearing being on the casing ends and the other half 5 being on the top 2 so that by raising the top or cover, the cylinder 6 which is supported by trunnions 7 and 8 extending from its ends and engaging the bearings, may be readily lifted from the casing.

The cylinder is preferably formed of glass with a smooth straight periphery and in one end of the cylinder is a fill opening 9 surrounded by an externally screwthreaded flange engaged by a screw cap 10 to close the opening. The trunnion 8 is formed integral with the cap 10 and extends outward from the axis thereof and is provided with an extended end to which a crank 11 is detachably secured for turning the cylinder in its bearings. In the bottom of the casing is located a series of pans 12 which are held in place against lateral movement by guide ribs 13 on the casing bottom. Each of the pans 12 is provided with suitable open bearings 14 upon each side wall to receive a shaft 15 of a roll 16 adapted to engage the lower side of the cylinder 6. These rolls are each held in yielding contact with the surface of the cylinder by providing each roll within an enlarged axial bore 17 into the ends of which are fitted rings 18 of rubber or other suitable yielding material and each of these rings is provided with an axial opening to receive the shaft 15, said roll being thus supported upon its shaft by the yielding rings or bushings which fill the ends of the axial bore of the roll and prevent dirt and cream or other material from getting into the bore around the shaft.

A series of cups 19 preferably formed of sheet metal which may be plated to make the same sanitary and pleasing to the eye, are adapted to be supported upon the forward ends of the pans 12, the base 20 of each cup being formed with turned down flanges 21 to engage the sides of the pans and hold the cups in place. Each cup is preferably of rectangular form at its upper end with straight upper side edges 22 which meet the end edges at right angles, the corner angles being preferably cut downward from the upper edge of the cup a short distance and rounded off to form round corners to the upper edge and provide yielding edges on the cup, one of which is adapted to engage the cylinder 6 when the cup is in place and serve to scrape the frozen material from the surface of the cylinder. Each cup is so proportioned that when it is in place with one flange or edge 22 against the cylinder its opposite flange will be engaged by the door 3 and the cup thus forced and held in contact with the surface of the cylinder by the closing of the glass door or front.

In operating the machine ice or other freezing medium is placed in the cylinder by removing the screw cap 10. The cap is then again screwed in place and the cylinder placed in the bearings 4 and the cover lowered to hold it in place. One or all of the pans 12 containing material to be frozen is then shoved into the casing between the ribs 13 with the rolls 16 in place in the pans. The cups 19 are then set in place upon the forward ends of the pans and the door 3 closed to hold the cups with their edges in contact with the cylinder. By turning the cylinder material will be carried up from the pans by the rolls 16 and deposited upon the surface of the cylinder in a thin layer where it will quickly freeze and as the cylinder is turned will be scraped off into the cups by the edges thereof contacting the cylinder. As many different kinds of frozen material may be made at one time as there are pans, and this material is taken directly from the cylinder by the cups in which it may be served thus obviating the necessity for separate serving dishes and the second handling of the frozen creams or ices.

The construction of the device is such that it may be readily taken apart for cleaning or refilling and is very sanitary. As the cups form means for scraping the material from the cylinder the device has but few parts and a cheap construction is secured. The operation of the device may be viewed through the glass front or door which door also serves to hold the cups in place and permits the ready insertion and removal of the several pans.

Having thus fully described my invention what I claim is:—

1. A device of the character described comprising a casing, a rotatable cylinder within the casing adapted to contain a freezing medium, a pan in the casing below the cylinder, a roll within the pan engaging the lower side of the cylinder, and a cup supported by the forward end of the pan with its upper edge in contact with the surface of the cylinder to scrape frozen material therefrom.

2. A device of the character described comprising a casing, a hinged top for the casing, said casing and top being provided with mating bearings, a cylinder provided with a trunnion at one end to engage one of the bearings, and provided with a fill opening at its opposite end, a cap for closing the opening, a trunnion on the cap to engage the other of said bearings, a series of parallel ribs on the bottom of the casing, a series of pans between said ribs, a hinge door to close the front of the casing and through which front the pans may be removed, a series of rolls detachably supported within the pans to engage the cylinder, and a series of receptacles detachably supported upon the forward end of the pans to receive frozen material from the cylinder.

3. A device of the character described, comprising a casing, a rotatable cylinder detachably supported within the casing, a pan beneath the cylinder for containing material to be frozen and provided with open bearings on its side walls, a roll to engage said cylinder formed with an enlarged axial bore, a shaft extending through the bore, yielding rings on the shaft fitting within the ends of the bore, and a receptacle within the casing to receive frozen material from the surface of the cylinder.

4. A device of the character described comprising a casing having an open top and front side, a hinge cover to close the top, said cover being formed with mating bearing members, a cylinder provided with trunnions at its ends to engage said bearings, a series of pans detachably supported within the bottom of the casing, rolls detachably supported within the pans in engagement with the cylinder, a series of cups supported upon the forward ends of the pans, flanges on the cups engaging the sides of the pans to hold the cups in place, a yielding upper edge portion upon each cup to engage the surface of the cylinder, and a hinged door for the front of the casing adapted to engage the cups and hold the same with their yielding edges in contact with the cylinder.

In testimony whereof I affix my signature in presence of two witnesses.

WILLIAM C. BROADWELL.

Witnesses:
ANNA M. DORR,
ANNA M. SHANNON.